(12) United States Patent
Koizumi et al.

(10) Patent No.: US 9,080,719 B2
(45) Date of Patent: Jul. 14, 2015

(54) DISPLAY DEVICE

(75) Inventors: Fumihiko Koizumi, Tachikawa (JP);
Shinobu Ofuchi, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 256 days.

(21) Appl. No.: 13/543,131

(22) Filed: Jul. 6, 2012

(65) Prior Publication Data

US 2013/0088816 A1   Apr. 11, 2013

(30) Foreign Application Priority Data

Oct. 7, 2011   (JP) ................................. 2011-223223

(51) Int. Cl.
*G06F 1/16* (2006.01)
*F16M 11/10* (2006.01)
*F16M 11/22* (2006.01)
*F16M 13/02* (2006.01)

(52) U.S. Cl.
CPC ............... *F16M 11/10* (2013.01); *F16M 11/22* (2013.01); *F16M 13/027* (2013.01); *F16M 2200/04* (2013.01); *F16M 2200/08* (2013.01)

(58) Field of Classification Search
USPC ........ 174/650, 21 R, 17 R, 59, 363; 345/173, 345/174, 204, 55, 690, 419, 32, 168, 652, 345/520, 170, 107; 361/679.21, 679.22, 361/679.23, 679.31, 679.32, 679.33, 361/679.53, 679.54; 349/58, 96, 63, 64, 349/110, 122, 73, 139; 362/602, 611, 297, 362/183, 296.01, 612, 97.1, 551
See application file for complete search history.

(56) References Cited

U.S. PATENT DOCUMENTS

| 5,487,524 A | 1/1996 | Bergetz |
| 5,659,376 A | 8/1997 | Uehara et al. |
| 8,026,996 B2 | 9/2011 | Matsuhira et al. |
| 2002/0067591 A1 | 6/2002 | Tajima |
| 2003/0025868 A1* | 2/2003 | Hiroshima et al. ........... 349/156 |
| 2005/0212424 A1* | 9/2005 | Kwon et al. .................. 313/582 |
| 2009/0009680 A1* | 1/2009 | Zensai ............................. 349/58 |
| 2009/0073643 A1 | 3/2009 | Chiang et al. |
| 2009/0122217 A1* | 5/2009 | Chen et al. ...................... 349/58 |
| 2009/0185100 A1 | 7/2009 | Matsuhira et al. |
| 2009/0215351 A1 | 8/2009 | Kobayashi et al. |
| 2011/0242456 A1* | 10/2011 | Hioki et al. ..................... 349/63 |
| 2011/0242742 A1 | 10/2011 | Kim et al. |

FOREIGN PATENT DOCUMENTS

| CN | 201878266 | 6/2011 |
| EP | 0638832 | 2/1995 |
| JP | H 05313161 | 11/1993 |
| JP | 2001-177786 | 6/2001 |

(Continued)

OTHER PUBLICATIONS

Japanese Patent Application No. 2011-223223, First Office Action, mailed Aug. 21, 2012, (with English Translation).

(Continued)

*Primary Examiner* — Hung Duong
(74) *Attorney, Agent, or Firm* — Blakely Sokoloff Taylor & Zafman LLP

(57) ABSTRACT

According to one embodiment, a display device includes a panel cell, a member structurally independent from the panel cell, and a fixing portion fixing the panel cell and the member.

11 Claims, 5 Drawing Sheets

(56) References Cited

FOREIGN PATENT DOCUMENTS

| | | |
|---|---|---|
| JP | 2001-283748 | 10/2001 |
| JP | 2004224855 | 8/2004 |
| JP | 2005-103176 | 4/2005 |
| JP | 2005301147 | 10/2005 |
| JP | 2006038923 | 2/2006 |
| JP | 2006209008 | 8/2006 |
| JP | 2006276790 | 10/2006 |
| JP | 2007225633 | 9/2007 |
| JP | 2009122160 | 6/2009 |
| JP | 2009122655 | 6/2009 |
| JP | 2009198755 | 9/2009 |
| JP | 2010066729 | 3/2010 |
| WO | WO 9529362 | 11/1995 |
| WO | WO 2008123852 | 10/2008 |

OTHER PUBLICATIONS

Japanese Patent Application No. 2011-223223, Final Office Action, mailed Nov. 20, 2012, (with English Translation).

European Application No./Patent No. 12171101.4; Extended European Search Report; Mailed Aug. 26, 2013.

* cited by examiner

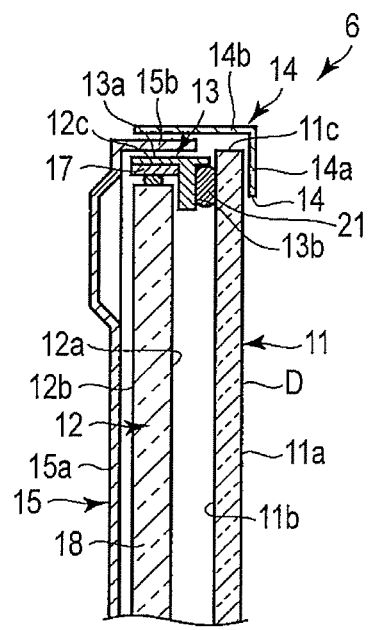
F I G. 3
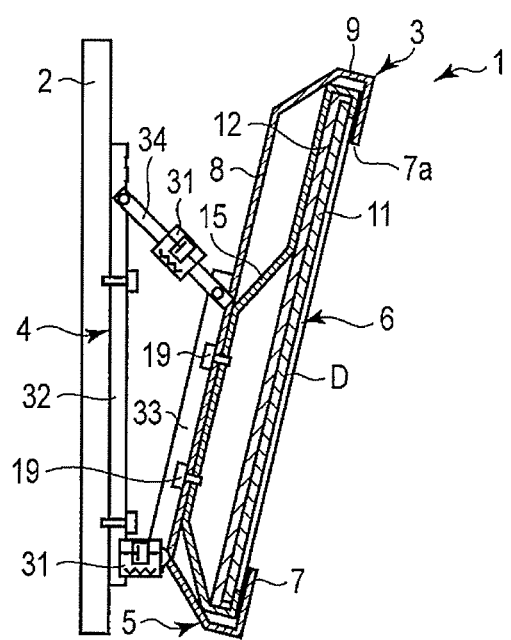
F I G. 4

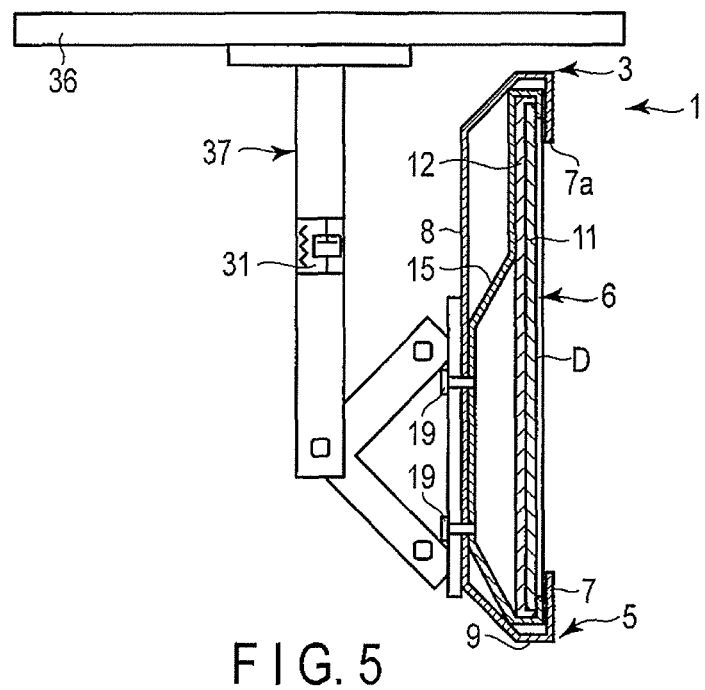
F I G. 5
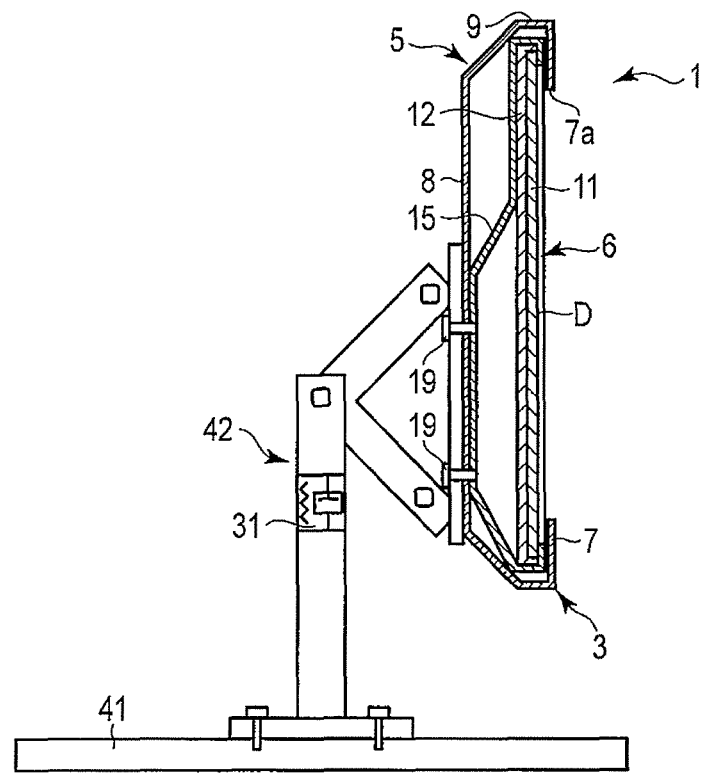
F I G. 6

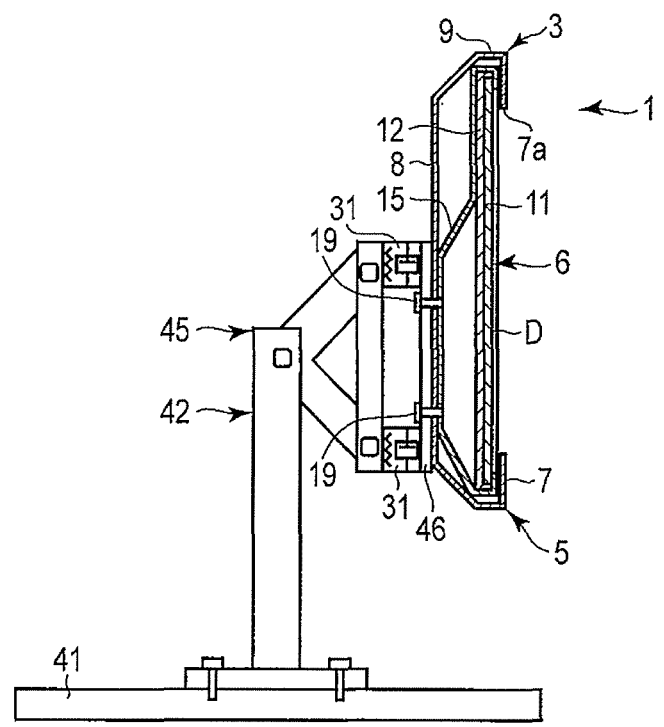
F I G. 7
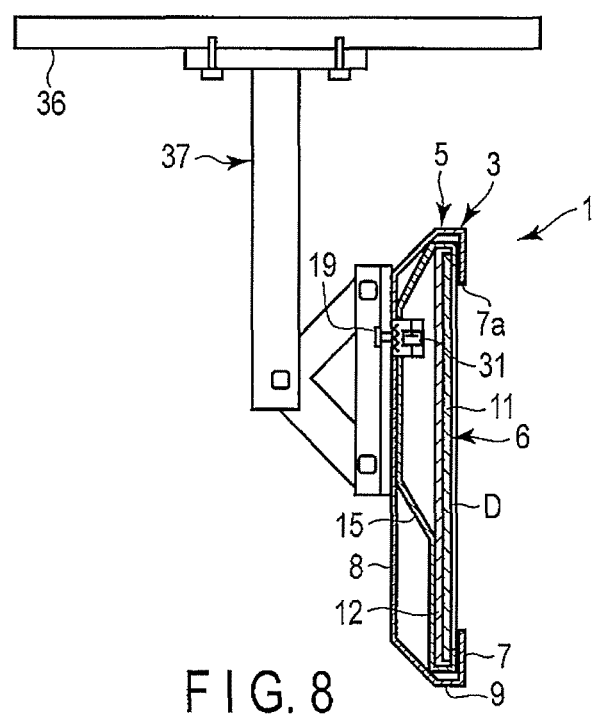
F I G. 8

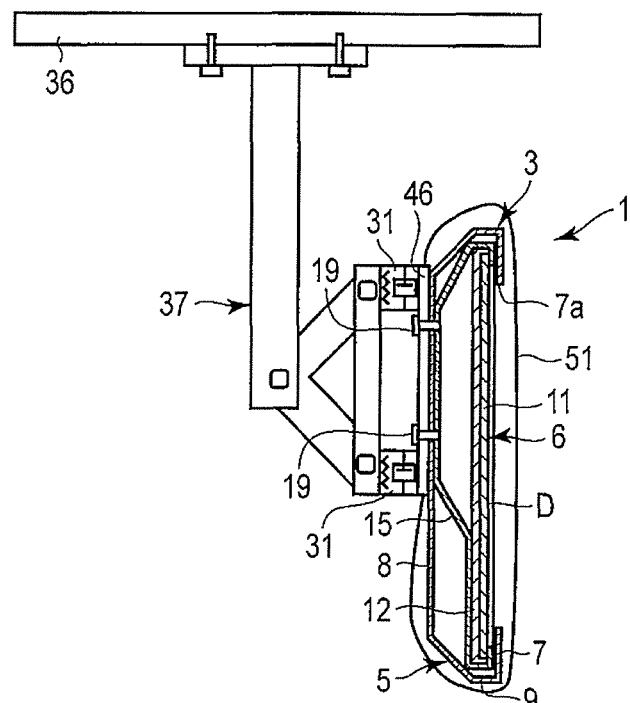
F I G. 9
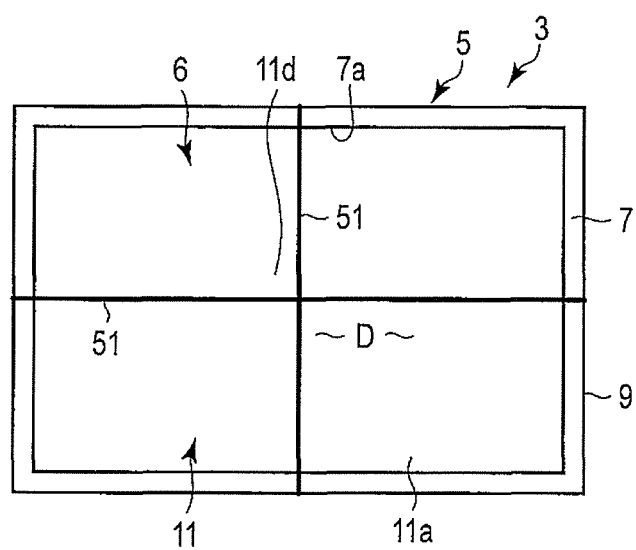
F I G. 10 ion No. 2011-
DISPLAY DEVICE

CROSS-REFERENCE TO RELATED APPLICATIONS

This application is based upon and claims the benefit of priority from prior Japanese Patent Applicat223223, filed Oct. 7, 2011, the entire contents of which are incorporated herein by reference.

FIELD

Embodiments described herein relate generally to display devices.

BACKGROUND

A display device including a buffer member has been provided.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary cross-sectional view of a panel unit according to a second embodiment;

FIG. 4 is an exemplary cross-sectional view of a display device according to a third embodiment;

FIG. 5 is an exemplary cross-sectional view of a display device according to a fourth embodiment;

FIG. 6 is an exemplary cross-sectional view of a display device according to a fifth embodiment;

FIG. 7 is an exemplary cross-sectional view of a display device according to a sixth embodiment;

FIG. 8 is an exemplary cross-sectional view of a display device according to a seventh embodiment;

FIG. 9 is an exemplary cross-sectional view of a display device according to an eighth embodiment; and FIG. 10 is an exemplary front view of the display device illustrated in FIG. 9.

DETAILED DESCRIPTION

Various embodiments will be described hereinafter with reference to the accompanying drawings.

In general, according to one embodiment, a display device comprises a panel cell, a member structurally independent from the panel cell, and a fixing portion fixing the panel cell and the member.

Hereinafter, embodiments will be described with reference to the drawings.

(First Embodiment)

Figure 1:
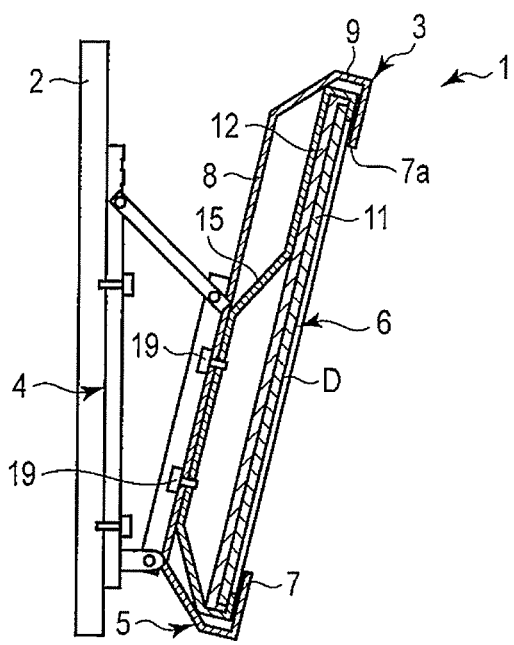
FIG. 1 is an exemplary cross-sectional view of a display device according to a first embodiment.
Figure 2:
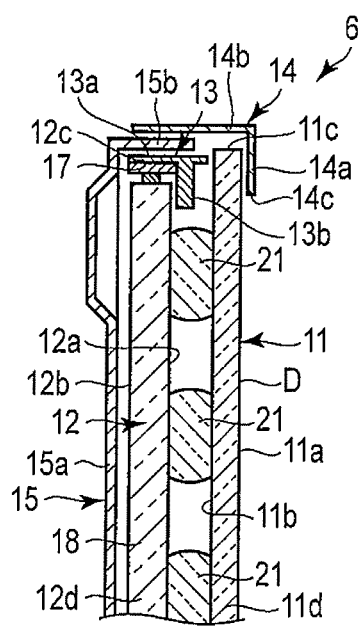
FIG. 2 is an exemplary cross-sectional view of a panel unit illustrated in FIG. 1.

FIGS. 1 and 2 illustrate a display device 1 according to a first embodiment. The display device 1 is an example of an "electronic apparatus" and is, for example, a television. In this embodiment, the display device 1 receives airwaves, but embodiments are not limited thereto. The display device 1 may be, for example, a monitor.

As illustrated in FIG. 1, for example, the display device 1 is attached to a wall 2 for use. The wall 2 is an example of a "place (installation portion) where a display device is to be installed". The "place where a display device is to be installed" is not limited to the wall, but may be, for example, a ceiling, a floor, or a television stand.

As illustrated in FIG. 1, the display device 1 according to this embodiment includes a display unit 3 (i.e., device main body) and a wall mount bracket 4 which attaches the display unit 3 to the wall 2. The wall mount bracket 4 is an example of an "installation unit" or a "supporting portion". The wall mount bracket 4 is provided between the display unit 3 and the wall 2 and supports the display unit 3.

The display unit 3 includes a housing 5 and a panel unit 6 which is accommodated in the housing 5. The housing 5 includes a front wall 7, a rear wall 8, and a circumferential wall 9 and forms a flat box shape. The font wall 7 comprises an opening 7a through which a display screen (i.e., display area D) of the panel unit 6 is exposed. The rear wall 8 is opposite to the front wall 7 with the panel unit 6 interposed therebetween and extends substantially in parallel to the front wall 7. The circumferential wall 9 connects the end of the front wall 7 and the end of the rear wall 8.

FIG. 2 illustrates the detailed structure of the panel unit 6. The panel unit 6 according to this embodiment is, for example, a liquid crystal display. The "panel unit" is not limited thereto, but may be a plasma display or other displays.

As illustrated in FIG. 2, the panel unit 6 includes a glass cell 11, a backlight unit 12, a spacer 13, a bezel 14 (e.g., front bezel), and a back cover 15. The glass cell 11 (e.g., glass liquid crystal cell) includes two glass plates (i.e., glass substrates) and liquid crystal which is sealed between the two glass plates. The glass cell 11 is an example of a "panel cell". The material forming the panel cell is not limited to glass, but the panel cell may be made of other materials.

The glass cell 11 includes a front surface 11a, a rear surface 11b (i.e., back surface), and a circumferential surface 11c. The front surface 11a is an example of a "first surface". The front surface 11a includes the display area D (i.e., display surface) and is exposed to the outside through the opening 7a of the housing 5. The rear surface 11b is an example of a "second surface". The rear surface 11b is opposite to the front surface 11a and extends substantially in parallel to the front surface 11a. The circumferential surface 11c extends in a direction crossing (for example, a direction substantially perpendicular to) the front surface 11a and the rear surface 11b and connects the edge of the front surface 11a and the edge of the rear surface 11b. Each of the "rear surface 11b" and the "circumferential surface 11c" is an example of a "portion other than the display area of a glass cell (i.e., panel cell)".

The backlight unit 12 is located on the rear side of the glass cell 11 and faces the rear surface 11b of the glass cell 11. The backlight unit 12 includes, for example, a light-emitting diode (LED) 17 serving as a light source and a light guide plate 18 that guides light emitted from the light source to the glass cell 11.

The backlight unit 12 is provided separately from the glass cell 11. The backlight unit 12 is an example of a "member structurally independent from a glass cell (i.e., panel cell)". The "member structurally independent from a glass cell (i.e., panel cell)" is not limited to the backlight unit, but may be, for example, the spacer 13, the back cover 15, or other members.

The backlight unit 12 includes a front surface 12a, a rear surface 12b (i.e., back surface), and a circumferential surface 12c. The front surface 12a faces the glass cell 11. The rear surface 12b is opposite to the front surface 12a and extends substantially in parallel to the front surface 12a. The circumferential surface 12c extends in a direction crossing (for example, a direction substantially perpendicular to) the front surface 12a and the rear surface 12b and connects the edge of the front surface 12a and the edge of the rear surface 12b.

As illustrated in FIG. 2, the spacer 13 is provided on the side (e.g., the upper side in FIG. 2) of the backlight unit 12. The spacer 13 is fixed to, for example, the back cover 15. The spacer 13 is an example of a "supporting member".

The spacer 13 includes a first portion 13a and a second portion 13b. The first portion 13a faces the circumferential surface 12c of the backlight unit 12. The second portion 13b is located between the glass cell 11 and the backlight unit 12 and forms an appropriate gap between the glass cell 11 and the backlight unit 12.

As illustrated in FIG. 2, the back cover 15 covers the rear side of the backlight unit 12. The back cover 15 includes a first portion 15a which faces the rear surface 12b of the backlight unit 12 and a second portion 15b which faces the circumferential surface 12c of the backlight unit 12. The spacer 13 is fixed to the second portion 15b.

As illustrated in FIG. 1, the back cover 15 and the housing 5 are fixed to the wall mount bracket 4 and the back cover 15 is supported by the wall mount bracket 4. The back cover 15 is fixed to the wall mount bracket 4 by, for example, screws 19. The backlight unit 12 is interposed and held between the back cover 15 and the second portion 13b of the spacer 13. That is, the backlight unit 12 is supported by the wall mount bracket 4 through the back cover 15 and the spacer 13.

As illustrated in FIG. 2, in this embodiment, fixing portions 21 which fix the glass cell 11 and the backlight unit 12 are provided between the glass cell 11 and the backlight unit 12. An example of the fixing portion 21 is an adhesive portion using an adhesive or a double-sided tape. The fixing portions 21 fix, for example, the rear surface 11b of the glass cell 11 and the front surface 12a of the backlight unit 12. In this way, the glass cell 11 is supported by the backlight unit 12.

The fixing portions 21 are partially provided on, for example, the rear surface 11b of the glass cell 11 and the front surface 12a of the backlight unit 12. The fixing portions 21 fix at least a central portion 11d of the glass cell 11 and a central portion 12d of the backlight unit 12. For example, the fixing portions 21 may be provided substantially on the entire rear surface 12b of the glass cell 11 and the entire front surface 12a of the backlight unit 12.

An example of the fixing portion 21 is a light transmissive member. The fixing portion 21 is configured to transmit light emitted from the backlight unit 12 to the glass cell 11. Therefore, even when the fixing portion 21 is provided between the backlight unit 12 and the glass cell 11, light emitted from the backlight unit 12 reaches the glass cell 11. The fixing portion 21 may or may not be transparent.

In this embodiment, the fixing portions 21 are provided between the glass cell 11 and the backlight unit 12. However, the position where the fixing portion 21 is provided is not limited thereto. The fixing portions 21 may fix a portion other than the display area D of the glass cell 11 and the member structurally independent from the glass cell 11. The fixing portions 21 may fix, for example, the rear surface 11b of the glass cell 11 and the back cover 15, or they may fix the rear surface 11b or the circumferential surface 11c of the glass cell 11 and the spacer 13. In addition, the fixing portions 21 may fix other portions.

As illustrated in FIG. 2, the bezel 14 forms a frame shape and covers the edge (e.g., peripheral edge) of the glass cell 11. The bezel 14 includes a first portion 14a that faces the front surface 11a of the glass cell 11 and a second portion 14b that faces the circumferential surface 11c of the glass cell 11 and a portion of the back cover 15. The first portion 14a comprises an opening 14c through which the display area D of the glass cell 11 is exposed to the outside. The bezel 14 is fixed to the back cover 15. The backlight unit 12, the spacer 13, and the back cover 15 are opposite to the opening 14c of the bezel 14 with the glass cell 11 interposed therebetween. In other words, the glass cell 11 is between the member (e.g., the backlight unit 12, the spacer 13, or the back cover 15) and the opening 14c of the bezel 14.

According to this structure, it is possible to provide the display device 1 capable of reliably holding the glass cell 11.

In general, the panel cell, such as the glass cell, is not fixed to a specific member. In many cases, the panel cell and the backlight unit are interposed and held between the bezel and the back cover. However, there is a possibility that the width of the frame of the display device will be further reduced. In the case where the width of the frame of the display device is further reduced, it is expected that the size of the bezel supporting the front surface of the glass cell will be reduced. For example, when the width of a front portion (e.g., first portion 14a) of the bezel is 4.8 mm, the width of an overlap portion between the front surface of the glass cell and the bezel is, for example, 0.8 mm. Therefore, for example, in a special case in which a strong impact, such as an earthquake, is applied, it is considered that the glass cell may come off from the bezel.

In contrast, the display device 1 according to this embodiment includes the fixing portion 21 that fixes the portion other than the display area D of the glass cell 11 and the member (for example, the backlight unit 12) which is structurally independent from the glass cell 11. According to this structure, the glass cell 11 is supported by the member (for example, the backlight unit 12) structurally independent from the glass cell 11 through the fixing portions 21. In this way, in the display device 1 with a narrow frame, it is possible to reliably hold the glass cell 11 and prevent the glass cell 11 from coming off from the bezel.

In this embodiment, the fixing portions 21 fix the rear surface 11b of the glass cell 11 and the backlight unit 12. The rear surface 11b of the glass cell 11 is a region having the largest area in the display device 1 except for the display area D. The rear surface 11b of the glass cell 11 and the front surface 12a of the backlight unit 12 can be used to ensure a large adhesion area for fixing the glass cell 11. In this way, it is possible to strongly hold the glass cell 11.

In this embodiment, the fixing portion 21 is a member which can transmit light emitted from the backlight unit 12 to the glass cell 11. According to this structure, it is possible to suppress problems caused by the fixing portions 21 provided between the backlight unit 12 and the glass cell 11.

In this embodiment, the fixing portion 21 fixes at least the central portion 11d of the glass cell 11 and the central portion 12d of the backlight unit 12. When vibration or impact is applied, the central portion 11d of the glass cell 11 is curved and the glass cell 11 may come off from the bezel 14. In this embodiment, the fixing portion 21 makes it difficult for the central portion 11d of the glass cell 11 to be deformed (e.g., curved). According to this structure, it is possible to reliably hold the glass cell 11.

(Second Embodiment)

Next, a display device 1 according to a second embodiment will be described with reference to FIG. 3. In the second embodiment, components including the same or similar functions as those in the first embodiment are denoted by the same reference numerals and the description thereof will not be repeated. Structures other than the following structure are the same as those in the first embodiment.

As illustrated in FIG. 3, in this embodiment, a fixing portion 21 is provided between a rear surface 11b of a glass cell 11 and a spacer 13 and fixes the glass cell 11 and the spacer 13. The spacer 13 is fixed to a back cover 15.

As illustrated in FIG. 3, the fixing portion 21 according to this embodiment is not provided between a backlight unit 12 and the glass cell 11. The fixing portion 21 is not limited to a transparent material, but may be a material which does not transmit light, such as a colored material or an opaque material.

According to this structure, similarly to the first embodiment, it is possible to provide the display device 1 capable of reliably holding the glass cell 11.

(Third Embodiment)

Next, a display device 1 according to a third embodiment will be described with reference to FIG. 4. In the third embodiment, components including the same or similar functions as those in the first embodiment are denoted by the same reference numerals and the description thereof will not be repeated. Structures other than the following structure are the same as those in the first embodiment.

As illustrated in FIG. 4, in this embodiment, A wall mount bracket 4 comprises impact absorbers 31 (e.g., buffers). The impact absorber 31 includes, for example, an elastic member, such as rubber or a spring, or a buffer member, such as a hydraulic damper or an air damper.

As illustrated in FIG. 4, the wall mount bracket 4 is configured to be between a wall 2 and a display unit 3. The wall mount bracket 4 includes a first member 32 configured to be fixed to the wall 2, a second member 33 fixed to the display unit 3, and a third member 34 provided between the first member 32 and the second member 33. The lower end of the second member 33 is connected to the lower end of the first member 32. The third member 34 extends between the upper end of the first member 32 and the upper end of the second member 33 and connects the first member 32 and the second member 33. That is, the wall mount bracket 4 is configured to be between the backlight unit 12 (or back cover 15, or spacer 13) and the wall 2.

As illustrated in FIG. 4, in this embodiment, the impact absorbers 31 are provided between the lower end of the first member 32 and the lower end of the second member 33 and in the middle of the third member 34. In this way, a portion of the impact and vibration transmitted from the wall 2 to the first member 32 is absorbed by the impact absorbers 31 before it is transmitted to the display unit 3. Therefore, a strong impact and vibration are less likely to be transmitted to the display unit 3.

According to this structure, similarly to the first embodiment, it is possible to provide the display device 1 capable of reliably holding the glass cell 11. In this embodiment, the impact absorbers 31 (e.g. buffers) are provided in the wall mount bracket 4. Therefore, a strong impact and vibration are less likely to be transmitted to the display unit 3 and it is possible to reliably hold the glass cell 11.

(Fourth Embodiment)

Next, a display device 1 according to a fourth embodiment will be described with reference to FIG. 5. In the fourth embodiment, components including the same or similar functions as those in the first and third embodiments are denoted by the same reference numerals and the description thereof will not be repeated. Structures other than the following structure are the same as those in the first embodiment.

As illustrated in FIG. 5, the display device 1 according to this embodiment includes a display unit 3 and an attachment member 37 which attaches the display unit 3 to a ceiling 36. The ceiling 36 is an example of a "place (i.e., installation portion) where a display device is to be installed". The attachment member 37 is an example of an "installation unit" or a "supporting portion" and is configured to be between the ceiling 36 and the display unit 3. That is, the attachment member 37 is configured to be between the backlight unit 12 (or back cover 15, or spacer 13) and ceiling 36.

As illustrated in FIG. 5, in this embodiment, the attachment member 37 comprises an impact absorber 31. For example, the impact absorber 31 is provided in the middle of the attachment member 37. Therefore, a portion of the impact and vibration transmitted from the ceiling 36 to the attachment member 37 is absorbed by the impact absorber 31 before it is transmitted to the display unit 3. In this way, a strong impact and vibration are less likely to be transmitted to the display unit 3.

According to this structure, similarly to the first embodiment, it is possible to provide the display device 1 capable of reliably holding a glass cell 11. In addition, similarly to the third embodiment, the impact and vibration from the ceiling 36 are reduced by the impact absorber 31 and it is possible to reliably hold the glass cell 11.

(Fifth Embodiment)

Next, a display device 1 according to a fifth embodiment will be described with reference to FIG. 6. In the fifth embodiment, components including the same or similar functions as those in the first and third embodiments are denoted by the same reference numerals and the description thereof will not be repeated. Structures other than the following structure are the same as those in the first embodiment.

As illustrated in FIG. 6, the display device 1 according to this embodiment includes a display unit 3 and a stand 42 which supports the display unit 3 on a floor 41 (or a television stand). The floor 41 (or a television stand) is an example of a "place (i.e., installation portion) where a display device is to be installed". The stand 42 is an example of an "installation unit" or a "supporting portion" and is configured to be between the floor 41 and the display unit 3. That is, the stand 42 is configured to be between the backlight unit 12 (or back cover 15, or spacer 13) and floor 41.

As illustrated in FIG. 6, in this embodiment, the stand 42 comprises an impact absorber 31. For example, the impact absorber 31 is provided in the middle of the stand 42. Therefore, a portion of the impact and vibration transmitted from the floor 41 to the stand 42 is absorbed by the impact absorber 31 before it is transmitted to the display unit 3. In this way, a strong impact and vibration are less likely to be transmitted to the display unit 3.

According to this structure, similarly to the first embodiment, it is possible to provide the display device 1 capable of reliably holding a glass cell 11. In addition, similarly to the third embodiment, the impact and vibration from the floor 41 is reduced by the impact absorber 31 and it is possible to reliably hold the glass cell 11.

(Sixth Embodiment)

Next, a display device 1 according to a sixth embodiment will be described with reference to FIG. 7. In a sixth embodiment, components including the same or similar functions as those in the first, third, and fifth embodiments are denoted by the same reference numerals and the description thereof will not be repeated. Structures other than the following structure are the same as those in the first embodiment.

As illustrated in FIG. 7, in this embodiment, a stand 42 includes a stand body 45 (i.e., installation unit body) which is configured to be placed on a floor 41 and an attachment plate 46 which is attached to a display unit 3. The attachment plate 46 is supported by the stand body 45 (i.e., installation unit body).

In this embodiment, impact absorbers 31 are provided between the stand body 45 and the attachment plate 46.

Therefore, a portion of the impact and vibration transmitted from the floor 41 to the stand 42 is absorbed by the impact absorbers 31 before it is transmitted to the display unit 3. In this way, a strong impact and vibration are less likely to be transmitted to the display unit 3.

According to this structure, similarly to the first embodiment, it is possible to provide the display device 1 capable of reliably holding a glass cell 11. In addition, similarly to the fifth embodiment, the impact and vibration from the floor 41 is reduced by the impact absorbers 31 and it is possible to reliably hold the glass cell 11.

According to the second to sixth embodiments, since the impact absorber 31 is provided in the installation unit (i.e., installation member) which supports the display unit 3, it is possible to achieve the general-purpose display unit 3.

(Seventh Embodiment)

Next, a display device 1 according to a seventh embodiment will be described with reference to FIG. 8. In the seventh embodiment, components including the same or similar functions as those in the first, third, and fourth embodiments are denoted by the same reference numerals and the description thereof will not be repeated. Structures other than the following structure are the same as those in the first embodiment.

As illustrated in FIG. 8, in this embodiment, an impact absorber 31 is provided in a display unit 3, instead of an attachment member 37. That is, the impact absorber 31 is provided between an installation unit (e.g., wall mount bracket 4, attachment member 37, or stand 42) and a member (e.g., backlight unit 12, spacer 13, or back cover 15) structurally independent from a glass cell 11 (i.e., panel cell).

Specifically, in this embodiment, the display unit 3 includes a portion to which the attachment member 37 is fixed and the impact absorber 31 is provided in the portion. For example, the impact absorber 31 is provided between a back cover 15 and the attachment member 37.

A panel unit 6 and a housing 5 are supported by the attachment member 37 through the impact absorber 31 and are not directly fixed to the attachment member 37. Therefore, a portion of the impact and vibration transmitted from a ceiling 36 to the attachment member 37 is absorbed by the impact absorber 31 before it is transmitted to the glass cell 11. In this way, a strong impact and vibration are less likely to be transmitted to the glass cell 11.

According to this structure, similarly to the first embodiment, it is possible to provide the display device 1 capable of reliably holding the glass cell 11. In addition, similarly to the fourth embodiment, the impact and vibration from the ceiling 36 is reduced by the impact absorber 31 and it is possible to reliably hold the glass cell 11.

Furthermore, this embodiment can be applied to the installation unit (that is, the structure in which the display unit 3 is supported by a wall mount bracket 4 or a stand 42) according to each of the third, fifth, and sixth embodiments. In other words, the impact absorber 31 may be between the installation unit (e.g., wall mount bracket 4 or stand 42) and the member (e.g., backlight unit 12, spacer 13, or back cover 15). In these embodiments, the impact absorber 31 may be provided in the display unit 3, instead of the installation unit. According to this structure, since the impact absorber 31 is provided in the display unit 3, it is possible to achieve a general-purpose installation unit (e.g., the general-purpose wall mount bracket 4, the general-purpose attachment member 37, and the general-purpose stand 42).

(Eighth Embodiment)

Next, a display device 1 according to an eighth embodiment will be described with reference to FIGS. 9 and 10. In the eighth embodiment, components including the same or similar functions as those in the first, third, and fourth embodiments are denoted by the same reference numerals and the description thereof will not be repeated. Structures other than the following structure are the same as those in the first embodiment.

As schematically illustrated in FIG. 9, in this embodiment, thin wires 51 (i.e., wire members) configured to face the display area D of a glass cell 11 and support the display area D are provided. In FIG. 9, for convenience of explanation, the thin wire 51 is illustrated so as to be separated from the display area D. However, actually, the thin wire 51 comes into contact with the display area D or it is arranged in the vicinity of the display area D.

The thin wire 51 is an example of a "pressing member" or "supporting member". The thin wire 51 faces the display area D of the glass cell 11 and is attached to (e.g., fixed to) an attachment member 37. The attachment member 37 is an example of a "member structurally independent from a glass cell (i.e., panel cell)". The wires 51 fix the panel cell (11) and the attachment member 37. The thin wire 51 may be attached to (e.g., fixed to), for example, a housing 5, a back cover 15, spacer 13, or a backlight unit 12, instead of the attachment member 37.

As illustrated in FIG. 10, for example, two thin wires 51 are provided. A first thin wire 51 is provided in a central portion of the glass cell 11 in the length direction and crosses the glass cell 11 in the vertical direction. A second thin wire is provided in a central portion of the glass cell 11 in the width direction and crosses the glass cell 11 in the horizontal direction. The first and second thin wires 51 faces the central portion of the glass cell 11 and press (i.e., support) a central portion 11d of the glass cell 11.

Herein, the term "face (or support) the display area" includes a case in which the thin wire comes into contact with the surface of the glass cell in a normal state and a case in which the thin wire is separated from the surface of the glass cell in a normal state and comes into contact with the surface of the glass when the glass cell comes off.

In this embodiment, a fixing portion 21 may not be provided. The thin wire 51 may be additionally applied to all of the first to seventh embodiments. That is, the thin wire 51 can be applied to the embodiments, regardless of the kind of installation unit (e.g., a wall mount bracket 4, the attachment member 37, and a stand 42), whether the fixing portion 21 is present or absent, and whether an impact absorber 31 is present or absent. In other words, the wire 51 may be attached to (e.g., fixed to), for example, a wall mount bracket 4, or a stand 42, instead of the attachment member 37. The thin wire 51 can be combined with various structures (e.g., the third, fourth, fifth, sixth, and seventh embodiments) including, for example, the impact absorber 31.

According to this structure, since a front surface 11a of the glass cell 11 is pressed by the thin wire 51, the glass cell 11 is reliably held even in a display device with a narrow frame. Therefore, it is possible to prevent the glass cell 11 from coming off. In addition, when the thin line is combined with the impact absorber 31, external impact and vibration are reduced by the impact absorber 31 and it is possible to reliably hold the glass cell 11.

The embodiments are not limited to the above-described embodiments, but the components according to the above-described embodiments may be changed without departing from the scope and spirit of the invention. In addition, a plurality of the components according to the above-described embodiments may be appropriately combined with each other to form various structures. For example, some of the components according to the above-described embodiments may be removed. Components according to different embodiments may be appropriately combined with each other.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a backlight unit;
   a panel cell comprising a first surface and a second surface, the first surface comprising a display area, the second surface opposite to the first surface and facing the backlight unit;
   a bezel comprising an opening exposing the display area; and
   a fixing portion interposed between the panel cell and the backlight unit, the fixing portion fixes the second surface of the panel cell to the backlight unit, and transmits light from the backlight unit to the panel cell.

2. The display device of claim 1, wherein the panel cell is a glass cell.

3. The display device of claim 1, wherein the fixing portion fixes at least a central portion of the panel cell to a central portion of the backlight unit.

4. The display device of claim 1, further comprising:
   an installation unit comprising an impact absorber, the installation unit configured to be between the backlight unit and a place where the display device is to be installed.

5. The display device of claim 1, further comprising:
   an installation unit configured to be between the backlight unit and a place where the display device is to be installed; and
   an impact absorber between the installation unit and the backlight unit.

6. The display device of claim 1, wherein the fixing portion is an adhesive portion.

7. The display device of claim 1, wherein the fixing portion is transparent.

8. A display device comprising:
   a backlight unit;
   a panel cell comprising a first surface and a second surface, the first surface comprising a display area, the second surface opposite to the first surface and facing the backlight unit;
   a bezel comprising an opening exposing the display area; and
   a plurality of fixing portions which are interposed between the panel cell and the backlight unit, fix the second surface of the panel cell to the backlight unit, and transmits light from the backlight unit to the panel cell, the plurality of fixing portions are provided such that a space is formed between the plurality of fixing portions.

9. The display device of claim 8, wherein the space extends from the backlight unit to the second surface of the panel cell.

10. The display device of claim 9, wherein the fixing portions are adhesive portions.

11. The display device of claim 8, wherein the backlight unit comprises a front surface, and the fixing portions fix the second surface of the panel cell to the front surface of the backlight unit.

* * * * *